(12) United States Patent
Gu

(10) Patent No.: US 9,994,280 B1
(45) Date of Patent: Jun. 12, 2018

(54) AUXILIARY CONTROL DEVICE FOR BICYCLE

(71) Applicant: TIEN HSIN INDUSTRIES CO., LTD., Taichung (TW)

(72) Inventor: Hung-Mao Gu, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 0 days. days.

(21) Appl. No.: 15/485,443

(22) Filed: Apr. 12, 2017

(51) Int. Cl.
*B62K 21/12* (2006.01)
*B62K 21/16* (2006.01)

(52) U.S. Cl.
CPC ............ *B62K 21/125* (2013.01); *B62K 21/16* (2013.01)

(58) Field of Classification Search
CPC ...... B62K 21/12; B62K 21/125; B62K 21/14; B62K 21/16
See application file for complete search history.

(56) References Cited

U.S. PATENT DOCUMENTS

| | | | | |
|---|---|---|---|---|
| 639,765 A * | 12/1899 | Phipps | ................... | B62K 21/16 403/328 |
| 5,154,095 A * | 10/1992 | Giard, Jr. | ............. | B62K 21/125 74/551.1 |
| 5,163,339 A * | 11/1992 | Giard, Jr. | ............. | B62K 21/125 403/374.4 |
| 6,928,897 B2 | 8/2005 | Duncan | | |
| 7,698,967 B2 * | 4/2010 | Ording | ................... | B62K 21/12 74/551.1 |
| 8,061,235 B2 * | 11/2011 | Nagao | .................... | B62K 21/22 74/551.3 |
| 8,172,247 B2 * | 5/2012 | Weber | .................. | B62K 21/125 280/278 |
| 8,850,923 B1 * | 10/2014 | Li | ......................... | B62K 21/125 74/551.8 |
| 9,415,825 B1 * | 8/2016 | Salazar | .................. | B62K 21/18 |
| 2005/0109150 A1 * | 5/2005 | Chiang | .................. | B62K 21/12 74/551.1 |

FOREIGN PATENT DOCUMENTS

DE         19635762 A1 *   3/1998   ............. B62K 21/16

* cited by examiner

*Primary Examiner* — Adam D Rogers
(74) *Attorney, Agent, or Firm* — Lynette Wylie; Apex Juris, pllc.

(57) ABSTRACT

An auxiliary control device includes an auxiliary handlebar having a handle member and a cushion member engaged with the handle member, an engaging base adapted to engage the auxiliary handlebar and a main handlebar of a bicycle, and a positioning member. The engaging base has a first base and a second base. The first base is engaged with the main handlebar, and has a first perforation, which has a first inner toothed portion parallel to an axial direction thereof formed on an inner wall thereof. The second base is engaged with the main handlebar, and has a second perforation, which has a second inner toothed portion parallel to an axial direction thereof formed on an inner wall thereof. The positioning member passes through the first and the second perforations. The positioning member has a positioning toothed portion provided on an outer wall thereof, corresponding to and meshing with the first and the second inner toothed portions.

10 Claims, 8 Drawing Sheets

US 9,994,280 B1

AUXILIARY CONTROL DEVICE FOR BICYCLE

BACKGROUND OF THE INVENTION

Technical Field

The present disclosure generally relates to a bicycle, and more particularly to an auxiliary control device for a bicycle.

Description of Related Art

In recent years, with the prevalence of saving energy and reducing carbon emission, bicycles have become popular tools for racing, sports, and commuting. When used in long-distance races and exercises, it is common to install an auxiliary control device such as a cushion member or an extension handlebar on the main handlebar of a bicycle, allowing the rider to rest the arms or elbows on the auxiliary control device, whereby the weight of the rider can be supported thereon. In this way, a rider could maintain better physical strength during a long-distance race or exercise.

However, a conventional auxiliary control device usually has a fixed structure, and therefore cannot be adjusted to fit the body shape of the rider. To solve this problem, the industry has developed a structure as disclosed in the U.S. Pat. No. 6,928,897, titled "Bicycle handlebar extension with integral armrest", wherein the angle and the position of the auxiliary control device could be adjusted by adjusting the positions of two adjusting screws. Although said structure disclosed in the aforementioned U.S. patent is adjustable, all of the adjusting screws have to be taken down and moved for adjustment every single time, which is troublesome and time-consuming. In other words, the aforementioned structure is still inconvenient to use.

Therefore, the conventional auxiliary control device still has room for improvements.

BRIEF SUMMARY OF THE INVENTION

In view of the reasons mentioned above, the primary objective of the present disclosure is to provide an auxiliary control device for a bicycle, which could be immediately and quickly adjusted as required.

The present disclosure provides an auxiliary control device for a bicycle having a main handlebar, wherein the auxiliary control device includes an auxiliary handlebar, an engaging base, and a positioning member. The auxiliary handlebar includes a handle member and a cushion member engaged with the handle member. The engaging base is adapted to engage the auxiliary handlebar and the main handlebar of the bicycle, and includes a first base and a second base, wherein the first base is adapted to be engaged with the main handlebar, and has a first perforation. A first inner toothed portion is formed on an inner wall of the first perforation, and is parallel to an axial direction of the first perforation. The second base is adapted to be engaged with the handle member, and has a second perforation. A second inner toothed portion is formed on an inner wall of the second perforation, and is parallel to an axial direction of the second perforation. The positioning member passes through the first perforation and the second perforation, wherein the positioning member has a positioning toothed portion provided on an outer wall thereof, corresponding to the first inner toothed portion and the second inner toothed portion. The positioning toothed portion meshes with the first inner toothed portion and the second inner toothed portion.

The present disclosure further provides an auxiliary control device for a bicycle having a main handlebar, wherein the auxiliary control device includes an auxiliary handlebar, an engaging base, and a fastening member. The auxiliary handlebar includes a handle member and a cushion member engaged with the handle member. The engaging base is adapted to engage the auxiliary handlebar and the main handlebar of the bicycle, and includes a first base and a second base, wherein the first base has an engaging portion having an outer toothed portion. The second base has a perforation. An inner toothed portion corresponding to the outer toothed portion is formed on an inner wall of the perforation. The engaging portion passes through the perforation to mesh the outer toothed portion with the inner toothed portion. The fastening member is detachably engaged with the engaging portion, and has a fastening abutting portion abutting against the second base, whereby to engage the second base and the first base.

With the above disclosure, when the auxiliary control device is installed on the main handlebar of the bicycle, each of the handle members could be held with one single hand, and the corresponding cushion member could be abutted against by the elbow of the holding hand.

With the engaging bases and the positioning members, or the engaging bases and the fasteners, the angle of the auxiliary control device of the present disclosure could be immediately and quickly adjusted as required, whereby to ease the known defect of the conventional structure that the adjustment cannot be done quickly.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
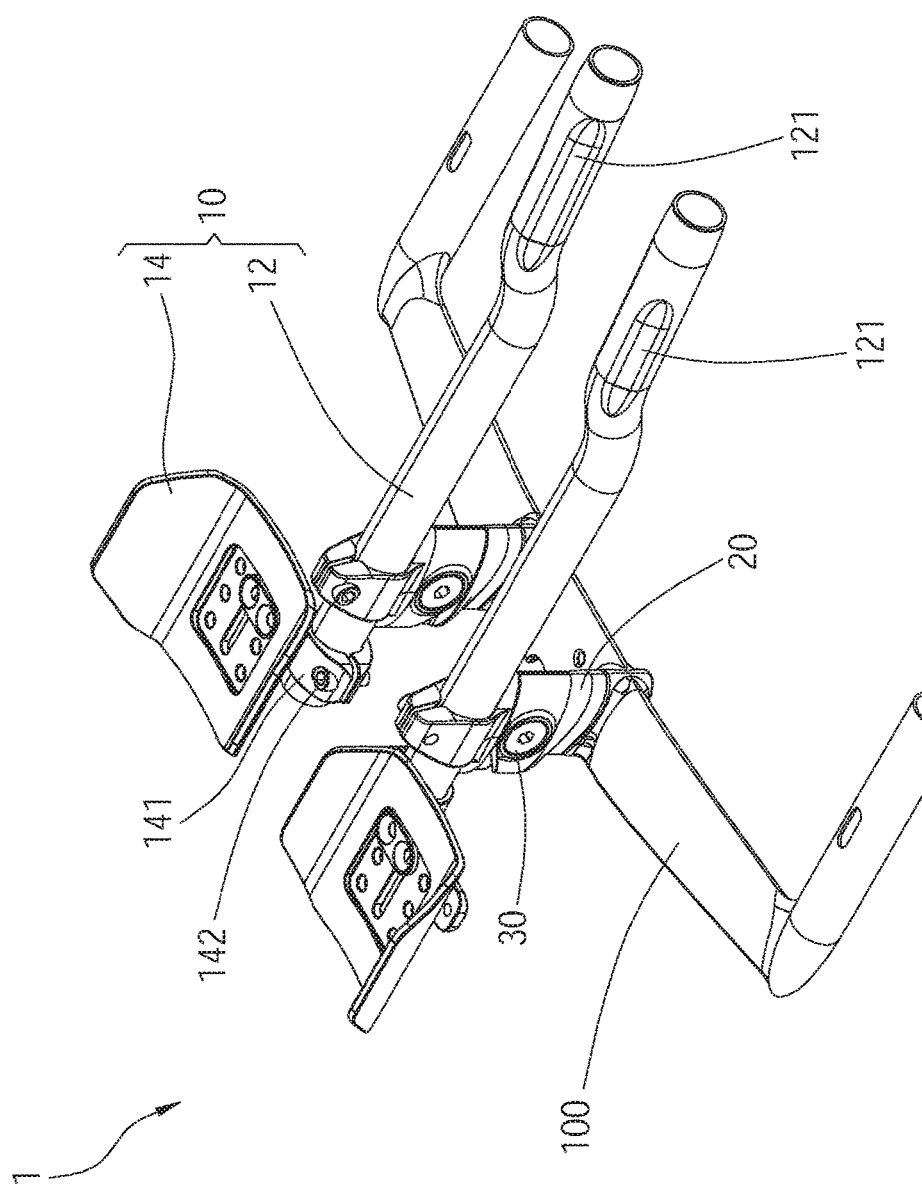
FIG. 1 is a perspective view of the auxiliary control device of a first embodiment of the present disclosure.
Figure 2:
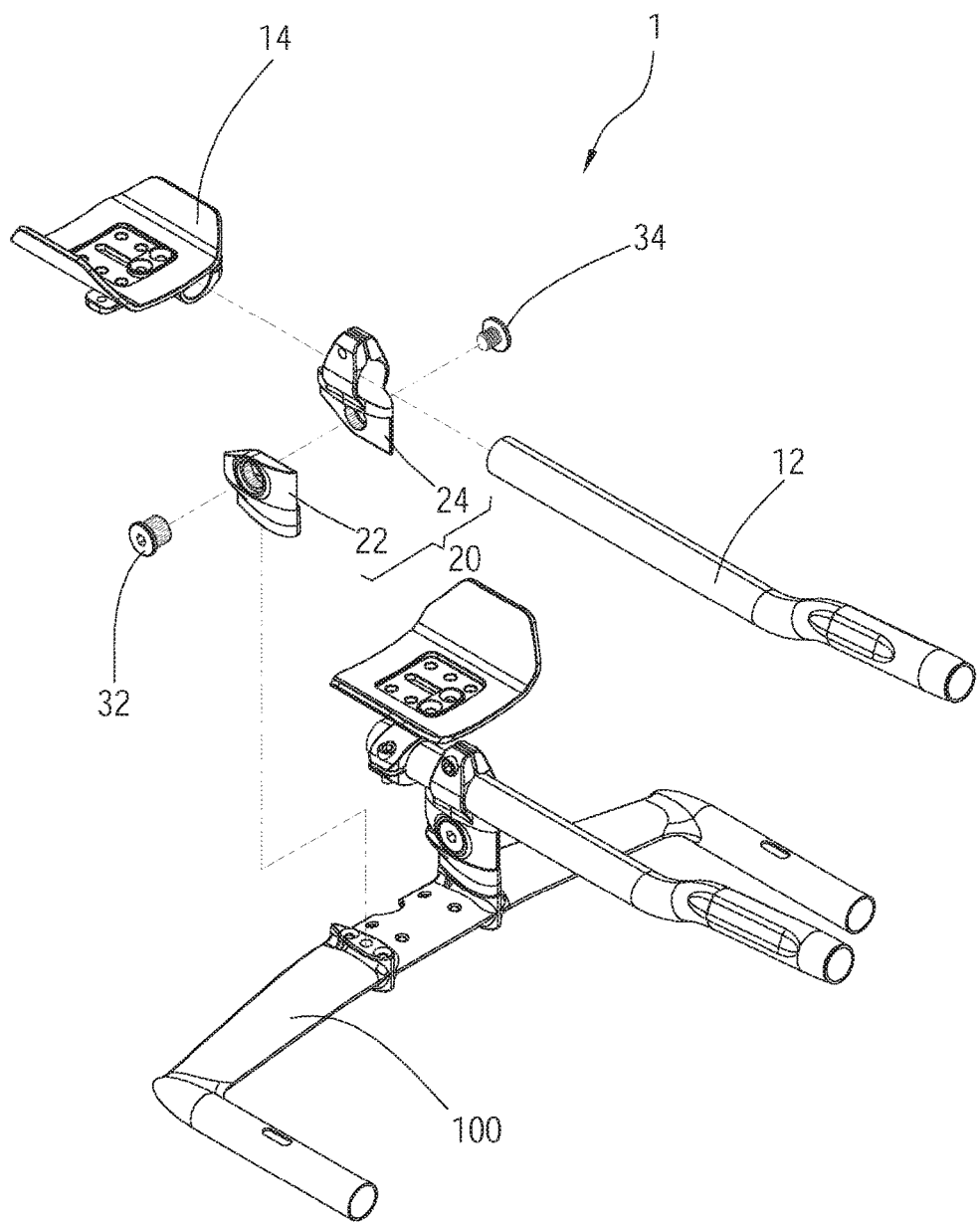
FIG. 2 is a partial exploded view of the first embodiment.
Figure 3:
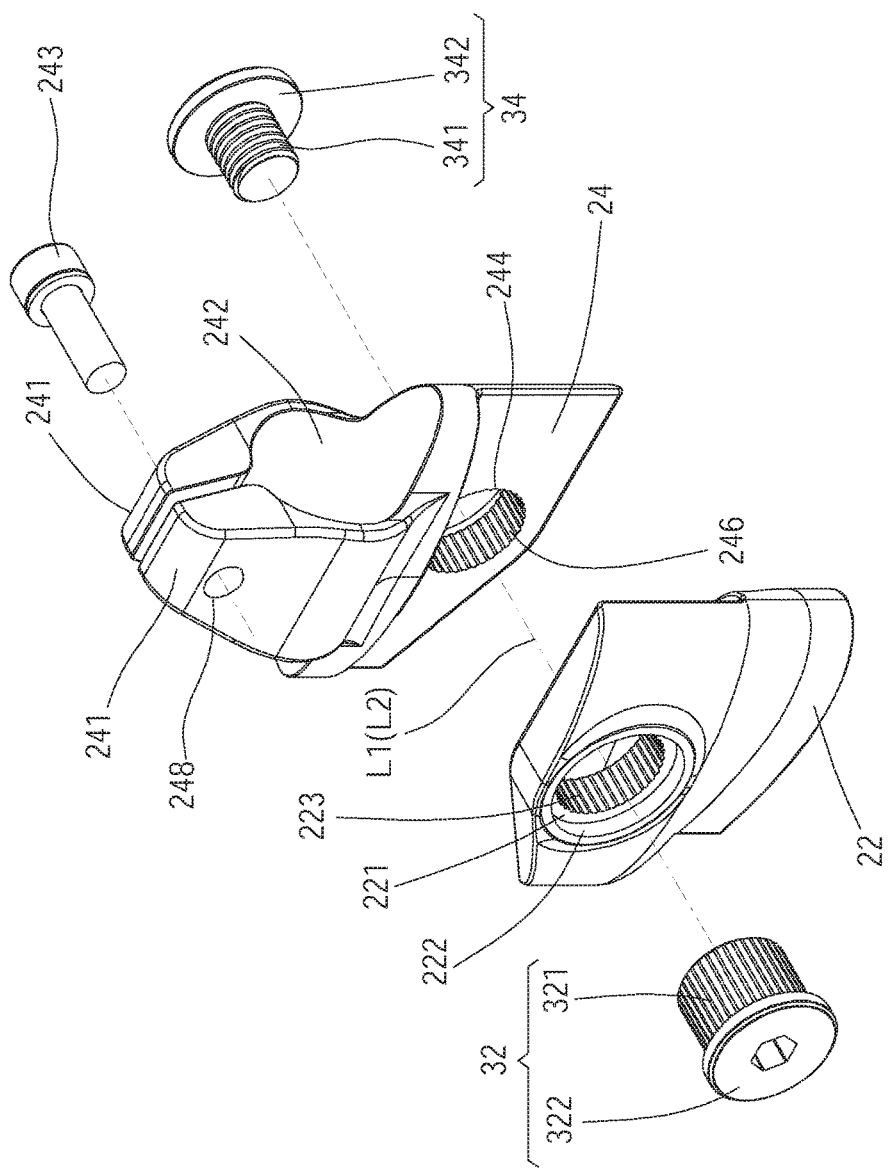
FIG. 3 is a perspective view, showing the engaging base and the positioning member of the first embodiment.

An auxiliary control device 1 of a first embodiment of the present disclosure for a bicycle is illustrated in FIG. 1 to FIG. 3, including two auxiliary handlebars 10, two engaging bases 20, and two positioning members 30, wherein the auxiliary control device 1 is adapted to be engaged with a main handlebar 100 of a bicycle.

Each of the auxiliary handlebars 10 includes a handle member 12 and a cushion member 14. In the first embodiment, a holding portion 121 is provided on an end of each of the handle members 12 to be held by the hand of the rider. Each of the cushion members 14a has a sleeve 141 provided below, wherein the sleeve 141 fits around another end of each of the handle members 12 opposite to the holding portion 121, whereby each of the cushion members 14 could be engaged with the corresponding handle member 12 to let the elbow of the rider rest thereon. In addition, each of the sleeves 141 has a screw 142 provided thereon to fasten or loosen the sleeve 142 on the corresponding handle member 12. Whereby, position or angle of each of the cushion members 14 on the handle members 12 could be adjusted depending on the length of the elbow of the rider.

Figure 4:
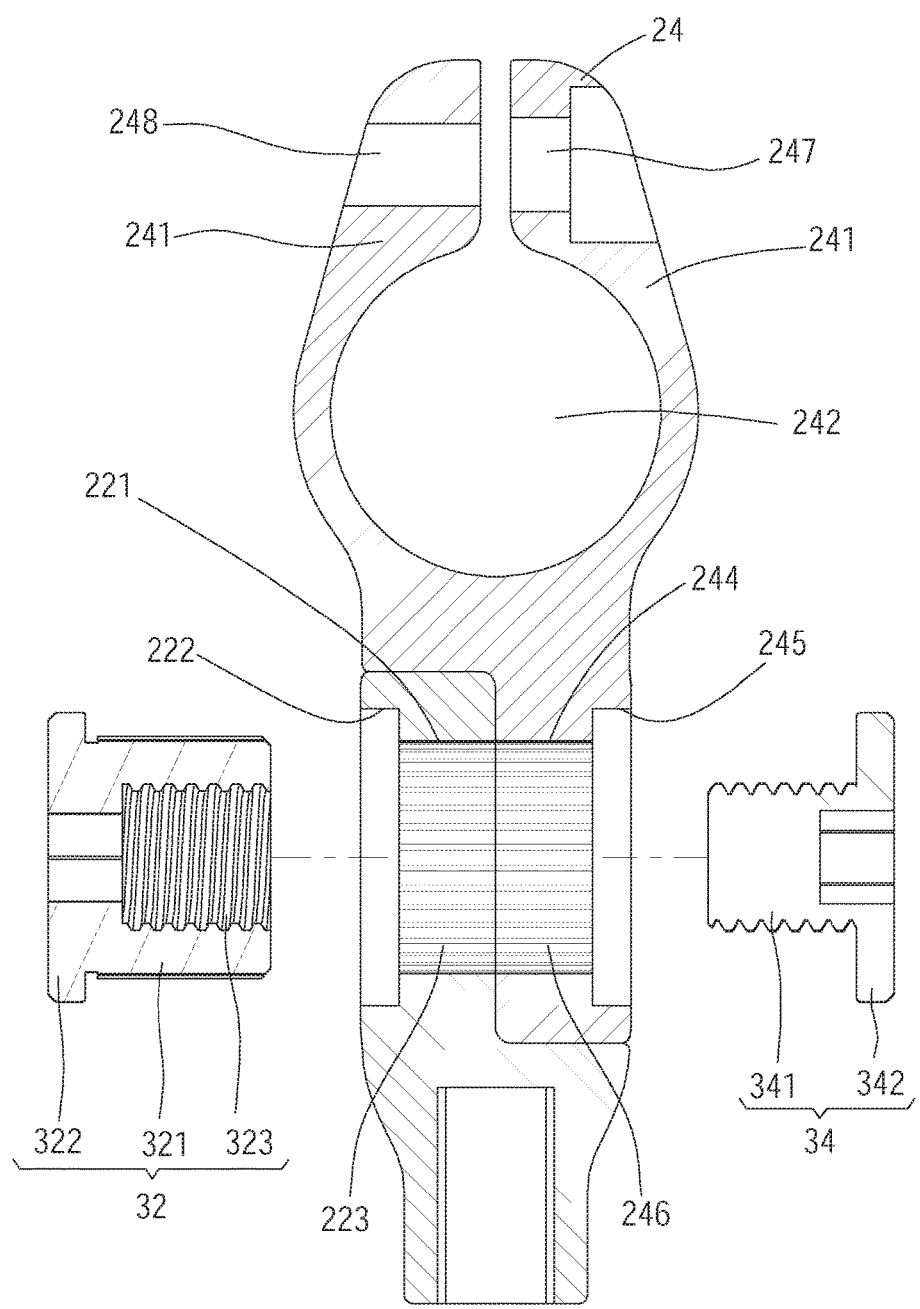
FIG. 4 is a sectional view, showing the condition of the first embodiment when the engaging base is not engaged with the positioning member.
Figure 5:
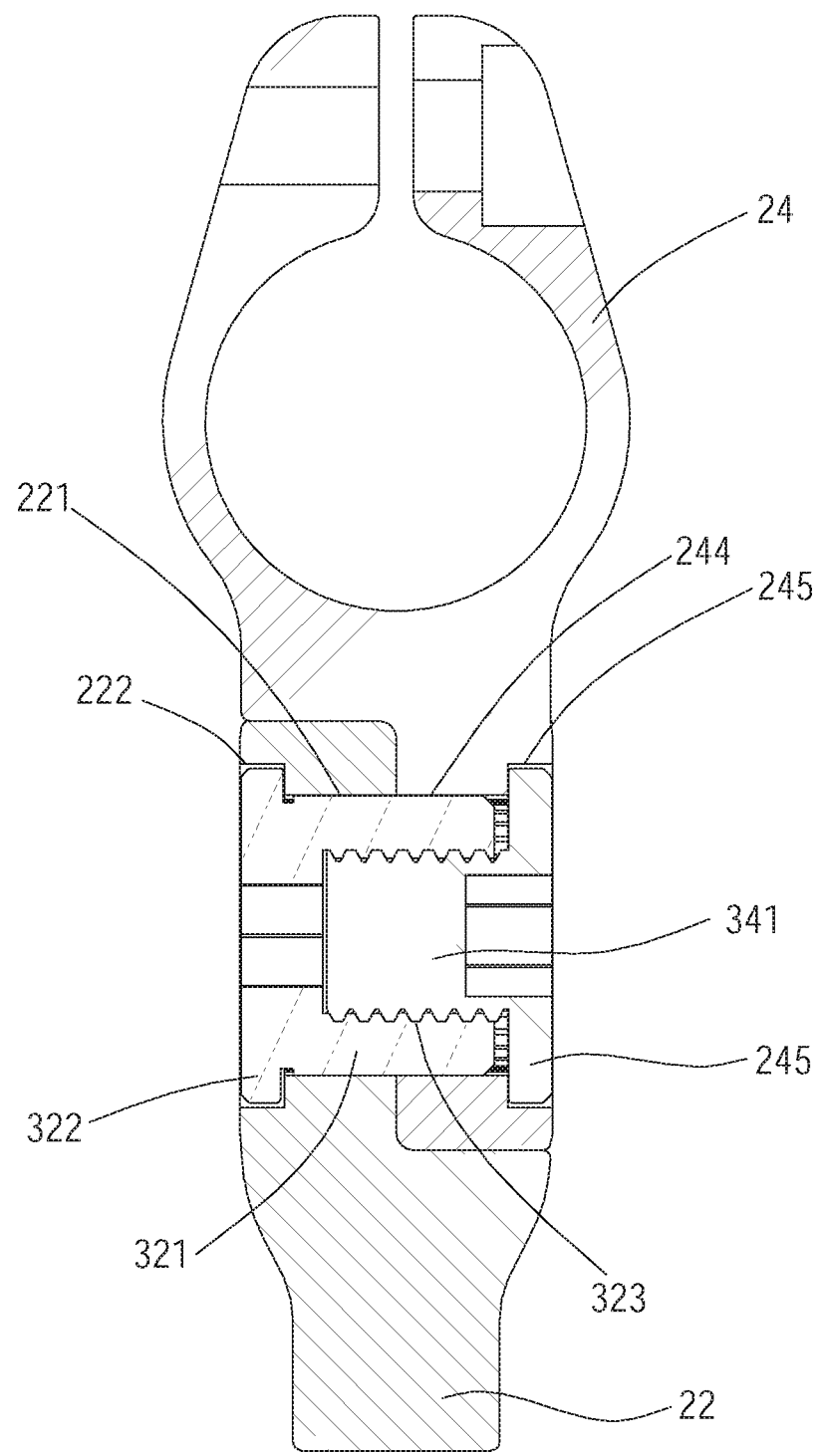
FIG. 5 is a sectional view, showing the condition of the first embodiment when the engaging base is engaged with the positioning member.

The engaging bases 20 are adapted to be installed on the main handlebar 100 of the bicycle at locations corresponding to the rider's arms. As shown in FIG. 3 to FIG. 5, each of the engaging bases 20 includes a first base 22 and a second base 24, wherein the first base 22 is adapted to be engaged with the main handlebar 100. Each of the first bases 22 further includes a first perforation 221 and a first counterbore 222, which are coaxially communicated with each other. In addition, a first inner toothed portion 223 is formed on an inner wall of each of the first perforations 221, wherein said first inner toothed portion 223 has a plurality of first inner teeth which are parallel to an axial direction L1 of the corresponding first perforation 221.

In the first embodiment, each of the second bases 24 has two engaging arms 241. An engaging bore 242 and an interval are formed between the engaging arms 241. More specifically, the interval is formed between an end portion of each of the engaging arms 241. The engaging bore 241 of each of the second bases 24 is adapted to be passed through by one of the handle members 12. In addition, the end portion of each of the engaging arms 241 has a perforation 247 and a threaded hole 248. An adjusting screw 243 passes through each of the perforations 247 to be engaged with the corresponding threaded hole 248, whereby to adjust the size of the interval between the engaging arms 241. In this way, the handle members 12 passing through the engaging bores 242 could be fixed or released by fastening or loosening the adjusting screws 241. Furthermore, each of the second bases 24 includes a second perforation 244 and a second counterbore 245, which are coaxially communicated with each other. A second inner toothed portion 246 is formed on an inner wall of each of the second perforations 244, wherein said second inner toothed portion 246 has a plurality of second inner teeth, which are parallel to an axial direction L2 of the corresponding second perforation 244. Also, the second perforation 244 of each of the second bases 24 aligns with the first perforation 221 of the corresponding first base 22, as shown in FIG. 4.

The positioning members 30 are adapted to fix the first bases 22 and the second bases 24. Each of the positioning members 30 includes an adjusting member 32 and a fastening member 34. The adjusting member 32 includes a positioning toothed portion 321 and a positioning abutting portion 322, wherein a positioning outer toothed portion is formed on an outer wall of the positioning toothed portion 321, corresponding to the first inner toothed portion 223 and the second inner toothed portion 246. The positioning abutting portion 322 is connected to a first end of the positioning toothed portion 321. In addition, the adjusting member 32 further includes a threaded hole 323, wherein an opening of the threaded hole 323 is located on a second end of the positioning toothed portion 321 opposite to the first end. The fastening member 34 has a threaded portion 341 and a fastening abutting portion 342 connected to an end of the threaded portion 341.

With the aforementioned design, as shown in FIG. 5, a relative position of each of the first bases 22 and the corresponding second base 24 could be adjusted first as required, which would change an angle between each of the auxiliary handlebars 10 and the main handlebar 100. After that, the adjusting member 32 of each of the positioning members 30 could pass through the corresponding first perforation 221 and the corresponding second perforation 224 in a row, so that the positioning outer toothed portion on the adjusting member 321 would mesh with the corresponding first inner toothed portion 223 and the corresponding second inner toothed portion 246, respectively. At last, the threaded portion 341 of each of the fastening members 34 could be screwed into the corresponding threaded hole 323, whereby the corresponding positioning abutting portion 322 would abut against a junction surface of the corresponding first base 22 between the first counterbore 222 and the first perforation 221 thereof, and the corresponding fastening abutting portion 342 would abut against a junction surface of the corresponding second base 24 between the second counterbore 245 and the second perforation 244 thereof. In this way, each of the first bases 22 could be fixedly engaged with the corresponding second base 24.

In addition, when it is necessary to adjust the position or the angle of one of the handle members 12 and the corresponding cushion member 14, the corresponding threaded portion 341 could be screwed off the corresponding threaded hole 323 to disengage the corresponding fastening member 34 and the corresponding adjusting member 32. Whereby, the corresponding second base 24 could be taken down. After determining the relative position of said second base 24 and the corresponding first base 22, the adjusting member 32 of the corresponding positioning member 30 could align with and insert into the second perforation 244 of the corresponding second base 24. And then, the threaded portion 341 of the corresponding fastening member 34 could screw into the corresponding threaded hole 323 to engage the corresponding fastening member 34 and the corresponding adjusting member 32, whereby to fix the related first base 22 and the related second base 24 again. In this way, the auxiliary control device 1 could be quickly adjusted. With the aforementioned design, the position or the angle of each of the handle members 12 and the corresponding cushion member 14 could be immediately and promptly adjusted as required to fit the body size of the rider. Therefore, the known defect of the conventional structure that the adjustment cannot be done quickly could be cured.

Figure 6:
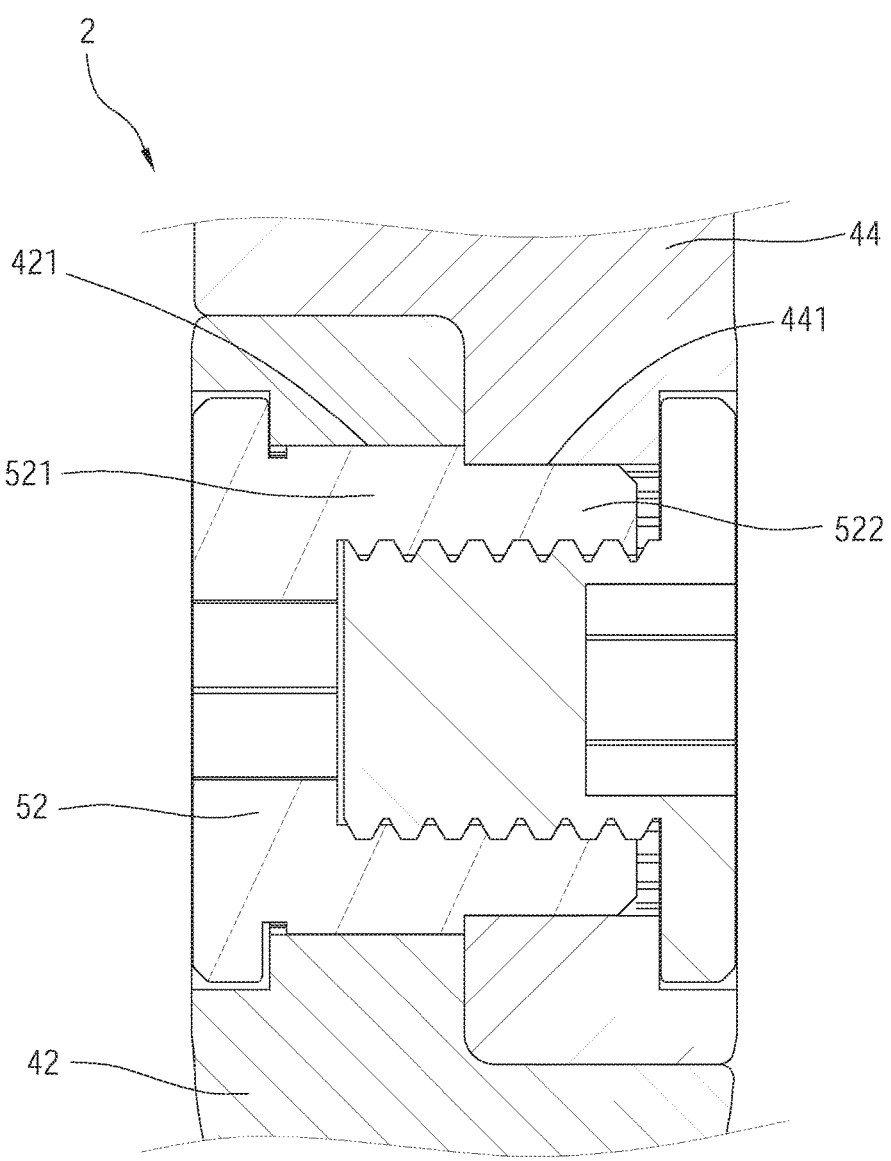
FIG. 6 is a sectional view of the auxiliary control device of a second embodiment of the present disclosure.

An auxiliary control device 2 of a second embodiment of the present disclosure is illustrated in FIG. 6, which basically has the same structure with the auxiliary control device 1 of the first embodiment, except that a diameter of a first perforation 421 of each first base 42 is different from a diameter of a second perforation 441 of each second base 44. More specifically, in the second embodiment, the diameter of each of the first perforations 421 is greater than the diameter of the corresponding second perforation 441. Also, the adjusting member 52 includes a first positioning toothed portion 521, which has a diameter corresponding to the diameter of the first perforation 421, and a second positioning toothed portion 522, which has a diameter corresponding to the diameter of the second perforation 441, wherein a plurality of first positioning outer teeth corresponding to the first inner toothed portion are formed on the first positioning toothed portion, while a plurality of second positioning outer teeth corresponding to the second inner toothed portion is formed on the second positioning toothed portion 522. With such design, the first positioning toothed portion is adapted to mesh with the first perforation 421, and the second positioning toothed portion 522 is adapted to mesh with the second perforation 441, whereby the relative position between each of the first bases 42 and the corresponding second base 44 could be fixed. Since the first perforation 421 and the second perforation 441 have different diameters, the auxiliary control device 2 of the second embodiment is foolproof, and therefore could be quickly and accurately assembled.

Figure 7:
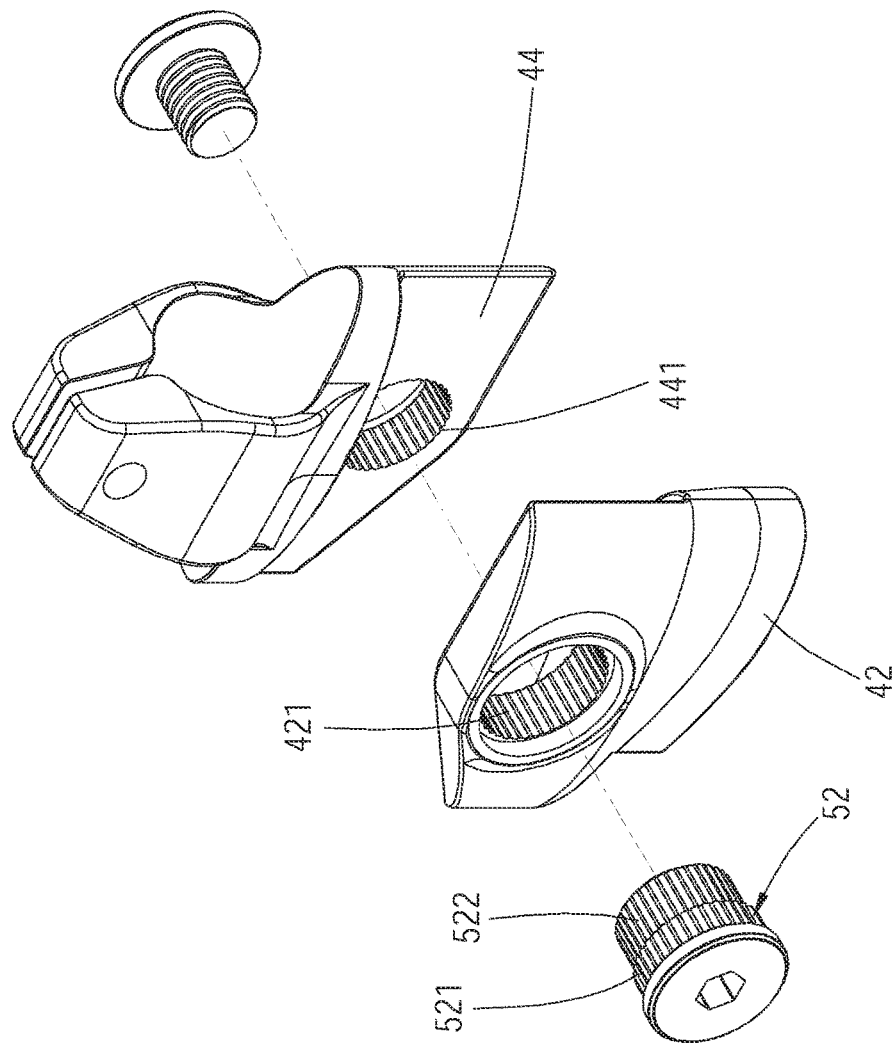
FIG. 7 is a perspective view of the second embodiment.

As shown in FIG. 7, on each side of the auxiliary control device 2 of the second embodiment, the first inner toothed portion of the first perforation 421 and the second inner toothed portion of the second perforation 441 have different sizes, which could enhance the physical strength of the engagement between the first base 42, the second base 44, and the corresponding positioning member. Furthermore, the angle of the corresponding handle could be quickly adjusted and even fine-tuned. In more details, the first inner toothed portion with bigger teeth is provided in the first perforation 421, while the second inner toothed portion with smaller teeth is provided in the second perforation 441. A quick adjustment over a large angle could be done by disengaging and re-assembling the first inner toothed portion of the first perforation 421 and the first positioning toothed portion of the adjusting member 52. As for fine tuning over a small angle, the rider could disengage and re-assemble the second inner toothed portion of the second perforation 441 and the second positioning toothed portion 522 of the adjusting member 52 to complete the adjustment. In the premise that the first perforation 421 and the second perforation 441 have different diameters, the first inner toothed portion of the first perforation 421 and the second inner toothed portion of the second perforation 441 could have the same size in another embodiment.

Figure 8:
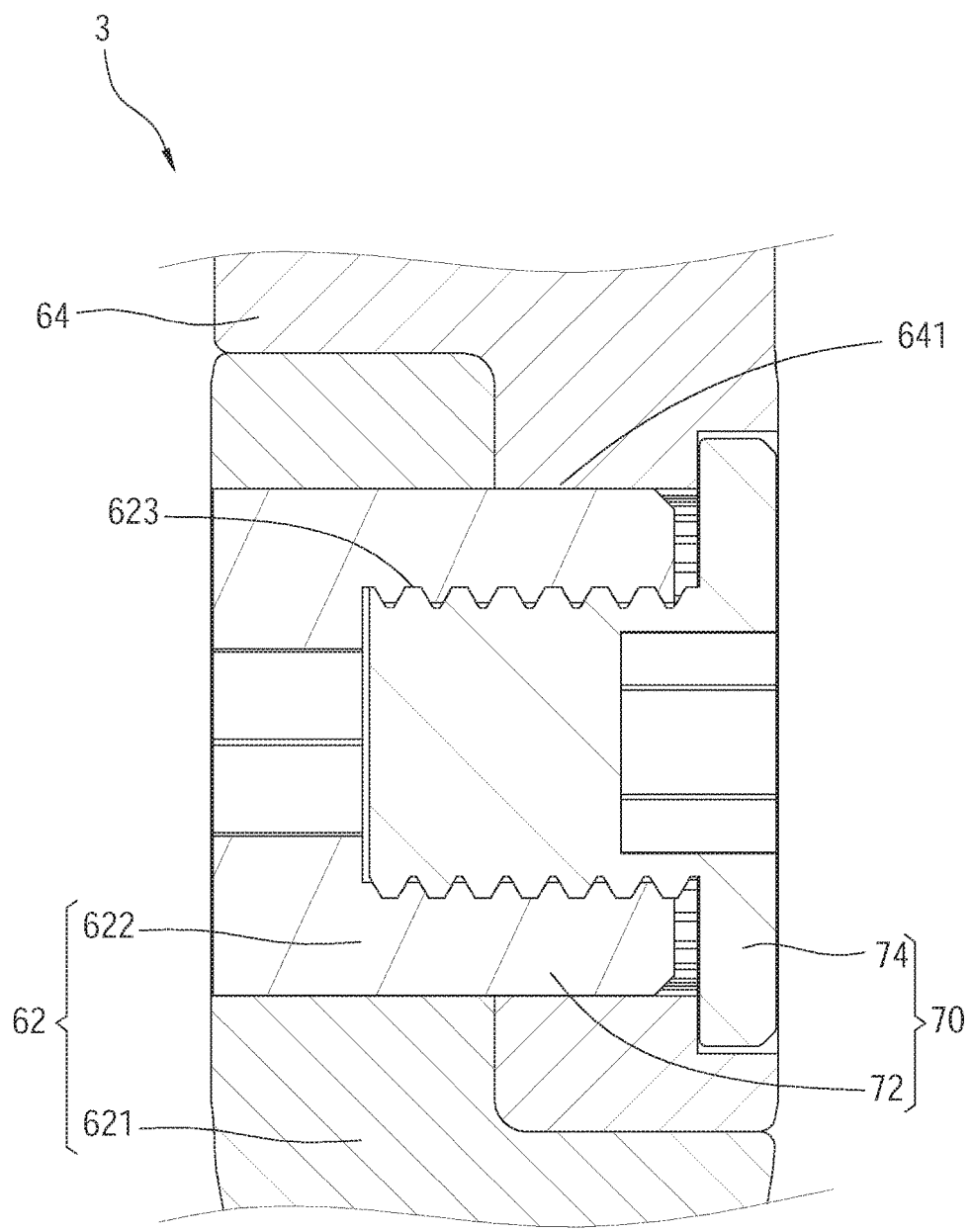
FIG. 8 is a sectional view of the auxiliary control device of a third embodiment of the present disclosure.

An auxiliary control device 3 of a third embodiment of the present disclosure is illustrated in FIG. 8, wherein the difference from the aforementioned embodiments is that each first base 62 includes a main body 621 and a positioning member 622. A part of the positioning member 622 is embedded in the main body 621 through press fitting or insert molding, so that the positioning member 622 and the main body 621 are tightly engaged. Another part of the positioning member 622 extends toward a corresponding second base 64 to form an engaging portion. In addition, the engaging portion has an outer toothed portion, and a threaded hole 623 is provided on an end of the engaging portion extending toward said second base 64. Said second base 64 has a perforation 641, and an inner toothed portion corresponding to said outer toothed portion is formed on an inner wall of the perforation 641. Once the relative position between one of the second bases 64 and the corresponding first base 62 is determined, the engaging portion formed by the positioning member 622 could pass through the corresponding perforation 641 to mesh the outer toothed portion with the inner toothed portion. Then, a threaded portion 72 of a fastening member 70 could screw into the threaded hole 623 so that a fastening abutting portion 74 would abut against said second base 64. As a result, said second base 64 and the corresponding first base 62 could be fixedly engaged.

In conclusion, with the aforementioned design, the angle of the auxiliary control device of the present disclosure could be immediately and quickly adjusted as required, which would cure the known defect of the conventional structure that the adjustment cannot be done quickly.

It must be pointed out that the embodiments described above are only some embodiments of the present disclosure. All equivalent structures which employ the concepts disclosed in this specification and the appended claims should fall within the scope of the present disclosure.

What is claimed is:

1. An auxiliary control device for a bicycle having a main handlebar, comprising:
    an auxiliary handlebar comprising a handle member and a cushion member engaged with the handle member;
    an engaging base, which is adapted to engage the auxiliary handlebar and the main handlebar, and comprises a first base and a second base, wherein the first base is adapted to be engaged with the main handlebar, and has a first perforation; a first inner toothed portion is formed on an inner wall of the first perforation, and is parallel to an axial direction of the first perforation; the second base is adapted to be engaged with the handle member, and has a second perforation; a second inner toothed portion is formed on an inner wall of the second perforation, and is parallel to an axial direction of the second perforation;
    a positioning member passing through the first perforation and the second perforation, wherein the positioning member has a positioning toothed portion provided on an outer wall thereof, corresponding to the first inner toothed portion and the second inner toothed portion; the positioning toothed portion meshes with the first inner toothed portion and the second inner toothed portion.

2. The auxiliary control device of claim 1, wherein the positioning member comprises an adjusting member and a fastening member; a first end of the adjusting member has a positioning abutting portion, and a threaded hole is provided on a second end of the adjusting member opposite to the first end; the positioning toothed portion is provided between the first end and the second end of the adjusting member; the fastening member has a threaded portion and a fastening abutting portion which are provided on an end of the fastening member; when the threaded portion screws into the threaded hole, the positioning abutting portion and the fastening abutting portion respectively abut against the first base and the second base.

3. The auxiliary control device of claim 1, wherein the positioning member has a positioning abutting portion and a fastening abutting portion respectively provided at each of two ends thereof; the positioning abutting portion and the fastening abutting portion respectively abut against the first base and the second base.

4. The auxiliary control device of claim 3, wherein the first base has a first counterbore coaxially communicating with the first perforation; the positioning abutting portion of the positioning member abuts against a junction surface of the first counterbore and the first perforation; the second base has a second counterbore coaxially communicating with the second perforation; the fastening abutting portion of the positioning member abuts against a junction surface of the second counterbore and the second perforation.

5. The auxiliary control device of claim 1, wherein a diameter of the first perforation is greater than a diameter of the second perforation; the positioning toothed portion of the positioning member further includes a first positioning toothed portion and a second positioning toothed portion; the first positioning toothed portion is engaged with the first perforation, and the second positioning toothed portion is engaged with the second perforation.

6. The auxiliary control device of claim 5, wherein the first positioning toothed portion has a plurality of first outer teeth, and the second positioning toothed portion has a plurality of second outer teeth; the second outer teeth and the first outer teeth have different sizes.

7. The auxiliary control device of claim 1, wherein the second base has an engaging bore; the handle member passes through the engaging bore to be engaged with the second base.

8. The auxiliary control device of claim 7, wherein the second base has two engaging arms, and the engaging bore is formed between the engaging arms; an interval is formed between an end portion of each of the engaging arms; the end portions of the engaging arms respectively have a perforation and a threaded hole; the auxiliary control device further comprises an adjusting screw, wherein the adjusting screw passes through the perforation to be engaged with the threaded hole, whereby to adjust a size of the interval.

9. An auxiliary control device for a bicycle having a main handlebar, comprising:
   an auxiliary handlebar comprising a handle member and a cushion member engaged with the handle member;
   an engaging base, which is adapted to engage the auxiliary handlebar and the main handlebar of the bicycle, and comprises a first base and a second base, wherein the first base has an engaging portion having an outer toothed portion; the second base has a perforation; an inner toothed portion corresponding to the outer toothed portion is formed on an inner wall of the perforation; the engaging portion passes through the perforation to mesh the outer toothed portion with the inner toothed portion;
   a fastening member which is detachably engaged with the engaging portion, and has a fastening abutting portion abutting against the second base, whereby to engage the second base and the first base.

10. The auxiliary control device of claim 9, wherein the first base comprises a main body and a positioning member; a part of the positioning member is embedded in the main body, whereby the positioning member is fixedly engaged with the main body; another part of the positioning member extends toward the second base to form the engaging portion.

\* \* \* \* \*